United States Patent [19]

Eckenbrecht

[11] 3,737,570

[45] June 5, 1973

[54] LINEARITY CORRECTION APPARATUS IN A FLYING SPOT SCANNER SYSTEM

[75] Inventor: Robert Roy Eckenbrecht, East Bethany, N.Y.

[73] Assignee: GTE Sylvania Incorporated, Seneca Falls, N.Y.

[22] Filed: Sept. 21, 1971

[21] Appl. No.: 182,381

[52] U.S. Cl...........178/7.2, 178/DIG. 28, 315/27 GD
[51] Int. Cl...............................................H04n 5/36
[58] Field of Search.................178/7.1, 7.2, DIG. 28; 315/27 GD

[56] References Cited

UNITED STATES PATENTS 2,817,788 12/1957 Landon et al....................315/27 GD

OTHER PUBLICATIONS

RCA Tech. Note No. 140, March 1962

*Primary Examiner*—Robert L. Richardson
*Attorney*—Norman J. O'Malley, Robert E. Walrath and Thomas H. Buffton

[57] ABSTRACT

In a flying spot scanner system having a transport means for continuously advancing a film of film frames through a film scanning zone and a light detector responsive to a light source vertically scanning the curved face plate of a cathode ray tube, linearity apparatus for altering the vertical scanning of the light source in a manner to effect linear scanning of a film frame.

6 Claims, 3 Drawing Figures

INVENTOR.
ROBERT R. ECKENBRECHT

BY
Robert C. Walrath

ATTORNEY

LINEARITY CORRECTION APPARATUS IN A FLYING SPOT SCANNER SYSTEM

CROSS-REFERENCES TO RELATED APPLICATIONS

Co-pending applications entitled "Continuous Electronic Film Scanner" filed Feb. 13, 1970 and having U.S. Pat. Nos. 3,019,483 and 3,621,121 relate to continuous film type flying spot scanner systems wherein the light source of a cathode ray tube is vertically altered in accordance with the movement of a film frame through a film scanning zone. Also, co-pending application entitled "Film Scanning System Linearity Apparatus" filed Spet. 14, 1970 and having U.S. Pat. No. 3,670,101 relates to an outwardly curved film guide means utilized to effect improved focus for cathode ray tubes with a curved face plate.

BACKGROUND OF THE INVENTION

Display systems and particularly those employing flying spot scanner systems normally employ a cathode ray tube having a flat or ground face plate. Also, the light available at the face plate, due to electron beam impingement, is directed onto a film of film frames and then to a light responsive detector to provide electrical signals representative to image information on the film.

The flying spot scanner system includes apparatus for transporting the film through a film scanning zone at a given rate. Also included is vertical scan modification signal development means responsive to the transport apparatus for providing an electrical signal varying in frequency and magnitude at substantially the same rate as the passage of a film frame through the film scanning zone. Moreover, a vertical scanning means provides electrical signals at the normal vertical scan rate (60 Hz) and these signals are combined with the vertical scan modification signals and applied to the cathode ray tube. Thus, the light source at the face plate of the cathode ray tube scans a film frame at the usual vertical scan rate and also advances vertically on the face plate at a rate substantially equal to the rate of movement of a film frame through the film scanning zone.

Although the above-mentioned flat or ground type face plates on cathode ray tubes have been and still are extensively employed, it has been found that there are other applications wherein a curved face plate is suitable. Moreover, cathode ray tubes with flat or ground face plates are expensive as compared with a curved face plate structure and such expense cannot be justified in some applications.

However, employment of a cathode ray tube having a curved face plate in a flying spot scanner system is not without problems, as set forth in the above-mentioned U.S. application entitled "Film Scanning System Linearity Apparatus" focus and linearity are of significance with a curved face plate structure. Specifically, constant linearity of a curved face plate structure would require a face plate having a radius of curvature equal to the radius of curvature of an electron beam. However, such structures have been found to be rather impractical and result in a cathode ray tube with severely restricted viewing capabilities.

Also, the employment of an outwardly curved film guide, as set forth in the above-mentioned application, does reduce the focus problem. However, linearity of film scanning is dependent upon the positional location of the light source on the surface of the curved face plate and this positional location is inherently nonlinear. Thus, some form of correction or a so-called "S-Curve" correction for angular deflection becomes necessary.

OBJECTS AND SUMMARY OF THE INVENTION

An object of the present invention is to provide an enhanced flying spot scanner system. Another object of the invention is to improve the linearity of a flying spot scanner system. Still another object of the invention is to provide linearity improvement apparatus responsive to a shift in signal magnitude rather than signal frequency. A further object of the invention is to provide improved scanning linearity of a film moving through a film scanning zone by a light source on a curved face plate of a cathode ray tube.

These and other objects, advantages and capabilities are achieved in one aspect of the invention by a flying spot scanner system having a cathode ray tube with a curved face plate and apparatus for varying the positional location of a light source on the face plate in accordance with the positioned location of a film frame in a film scanning zone whereby linearity of vertical scanning therebetween is achieved.

PREFERRED EMBODIMENT OF THE INVENTION

For a better understanding of the present invention, together with other and further objects, advantages, and capabilities thereof, reference is made to the following disclosure and appended claims in connection with the above-described drawings.

Figures 1, 2:
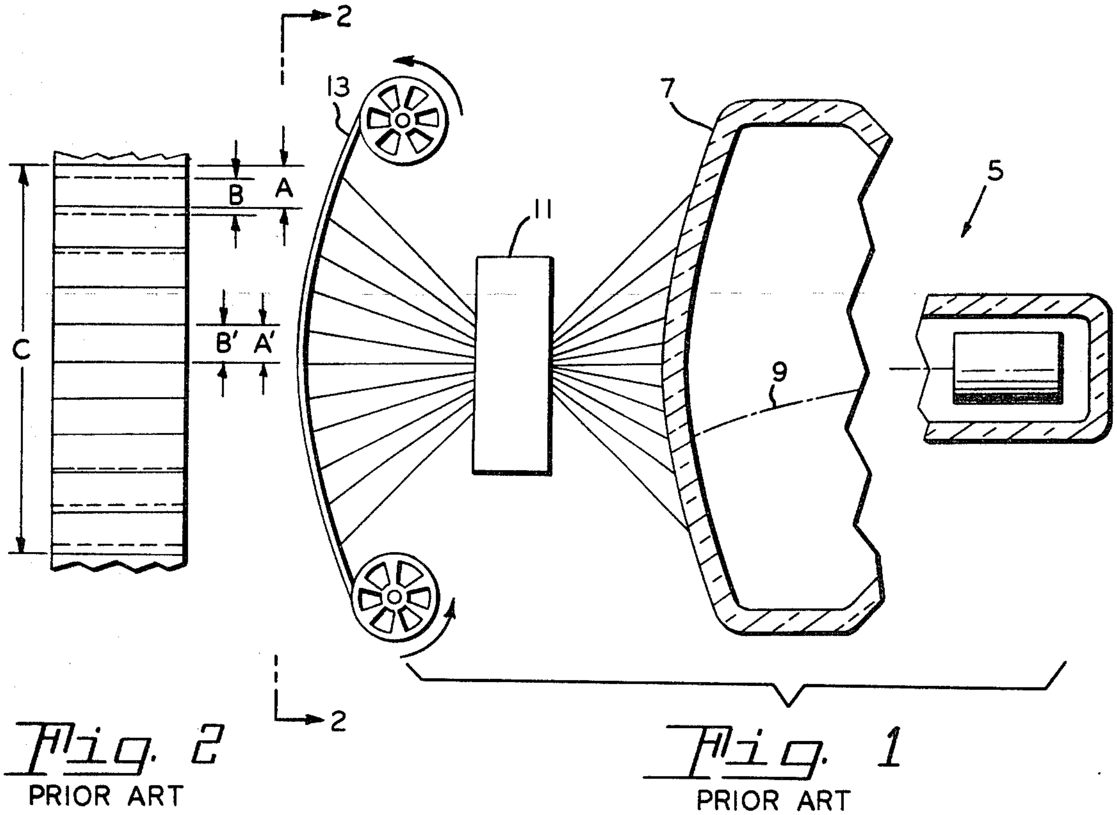
FIG. 2 PRIOR ART, FIG. 1 PRIOR ART
FIG. 1 is a prior art explanatory diagram illustrating the linearity problems with a cathode ray tube having a curved face plate.
FIG. 2 is a side elevational view of FIG. 1 taken along the line 2—2.

Referring to the prior art illustration of FIG. 1, a flying spot scanner system includes a cathode ray tube 5 having a curved face plate 7. A light source, derived from inpingement of the curved face plate 7 by an electron beam 9, is directed by a lens 11 onto a film of film frames 13. The film of film frames 13 is spaced from the lens 11 and has a radius of curvature substantially similar to the curvature of the face plate 7.

The film of film frames 13 is continously moved at a preselected rate through a film scanning zone C as can be seen in FIG. 2 of the side elevational view taken along the line 2—2. Also, the electron beam 9 striking the face plate 11 becomes increasingly divergent as the vertical distance from the longitudinal axis increases. Thus, the light scanned Area A is greater than the area of the film frame B at the vertical extremities of the scanning zone C but substantially similar to A'B' at the center of the film scanning zone C. Thus, it can be understood that linearity correction is desirable.

Figure 3:
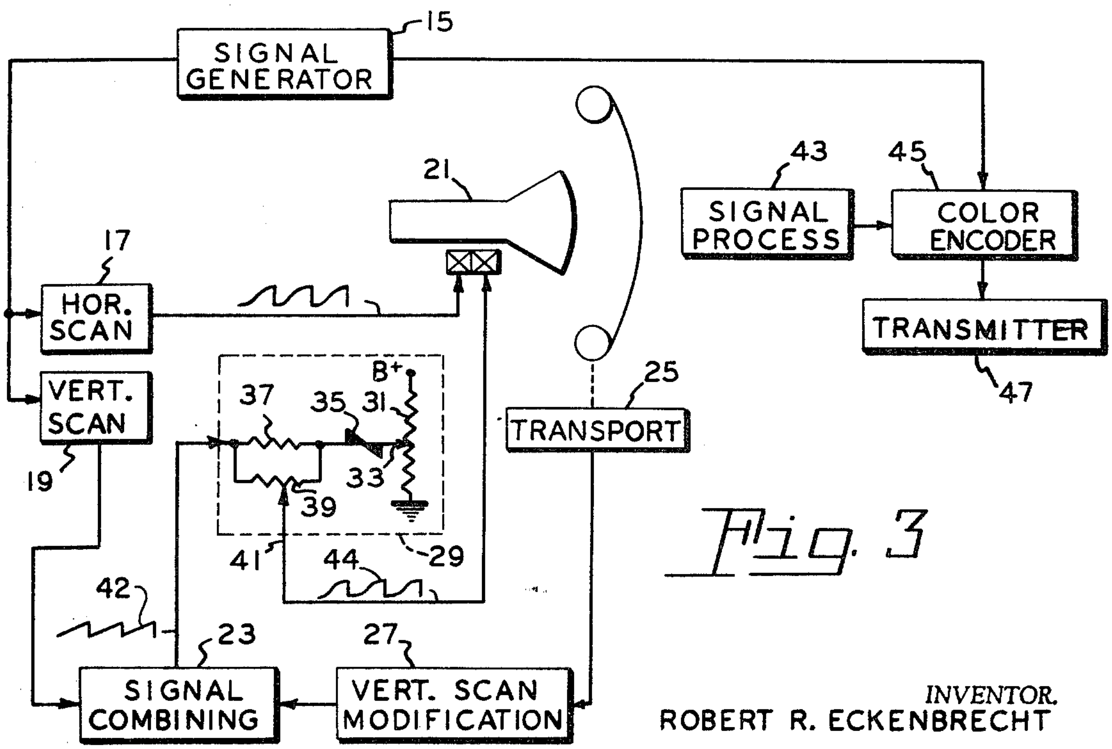
FIG. 3 is a block and schematic illustration of a flying spot scanner system employing a preferred embodiment of the invention.

As to linearity correction apparatus, FIG. 3 illustrates a flying spot scanner system having a signal generator 15 providing signals for horizontal and vertical scanning apparatus, 17 and 19 respectively. The horizontal scanning apparatus 17 provides scanning signals at a horizontal frequency which are applied to a cathode ray tube 21 to effect horizontal scanning in a manner well-known in the art.

The vertical scanning apparatus 19 provides signals at a vertical scan rate, preferably but not necessarily 60 Hz for example, which are applied to a signal combining network 23. Also, a transport means 25 provides a signal representative of the rate and frequency of advancement of a film frame through a film scanning zone. This signal is applied to a vertical modification signal development means 27 wherein electrical signal representative of the frequency and rate of advancement are provided and applied to the signal combining network 23.

The signal combining network 23 combines the vertical scan and vertical scan modification signals and applies the combined signal to linearity correction apparatus 29. In turn, the linearity correction apparatus 29 alters and applies the altered combined vertical scan and vertical scan modification signals to the cathode ray tube 21.

The linearity correction apparatus 29 includes a first alterable resistor 31 connected intermediate a potential source B+ and a potential reference level such as circuit ground. The first alterable resistor 31 has an adjustable arm 33 connected to a voltage dependent resistor (VDR) 35 which is, in turn, coupled by an impedance 37 to the signal combining network 23. A second alterable resistor 39 shunts the impedance 37 and has an adjustable arm 41 connected to the cathode ray tube 21 on the usual vertical driver and yoke apparatus associated therewith.

As to operation, the first alterable resistor 31 provides an adjustable DC potential whereby the bias potential applied to the VDR 35 is adjusted such that a minimum current flow therethrough is achieved when the electron beam of the CRT 21 is centered. Also, the VDR 35 is of a form such that a substantially sawtooth-shaped waveform 42 applied thereto from the signal combining network means is substantially overcorrected. This sawtooth waveform 42 and the overcorrected waveform are combined to provide a desired so-called "s"-corrected waveform 44 which is applied to the cathode ray tube 21. Moreover, the second alterable resistor 39 serves as a means for providing a desired amount of the "s"-corrected waveform 44.

In turn, the "s"-corrected waveform 44 is applied to the cathode ray tube 21 to effect a varying amount of alteration of the electron beam deflection throughout the scanning zone C. Thus, a desired linearity of scanning of a film frame is achieved throughout the scanning zone C and a given scan line appears at the same point on the film frame regardless of the positional location of the electron beam on the face plate of the CRT 21.

Additionally, image information signals are processed by a signal processing stage 43 associated with the cathode ray tube 21 and applied to a color encoder stage 45. The color encoder stage 45 also receives synchronizing information from the signal generator 15 and provides output signals which are applied to a signal transmitter 47 suitable for transmission of a composite color television signal.

Thus, there has been provided a unique flying spot scanner system utilizing improved linearity correction apparatus for providing enhanced color signals suitable for transmission. The linearity apparatus, which is DC coupled into the system, provides the desired "s"-curve correction in a manner which is independent of the frequency but dependent upon the magnitude of the signals representing film movement through a film scanning zone.

While there has been shown and described what is at present considered the preferred embodiment of the invention, it will be obvious to those skilled in the art that various changes and modifications may be made therein without departing from the scope of the invention as defined by the appended claims.

I claim:

1. In a flying spot scanner system having a cathode ray tube with a curved face plate and providing a light source for application to a film of film frames continuously advanced at a pre-selected rate through a film scanning zone by a transport means wherein a light detector is vertically scanned at a non-linear rate with respect to vertical deflection of the light source, linearity correction apparatus comprising:
- a flying spot scanner tube;
- vertical scanning signal development means;
- vertical scan modification signal development means coupled to said transport means to effect development of vertical scan modification signals continuously varying at a rate substantially equal to said pre-selected rate of film frame advancement through said film scanning zone;
- signal combining network means coupled to said vertical scanning signal development means and said vertical scan modification signal development means to effect development of a combined vertical scan and vertical scan modification signal; and
- linearity correction means including a voltage dependent resistor (VDR) responsive to the magnitude of said combined vertical scan and vertical scan modification signals for effecting alteration in the magnitude of said vertical scan modification signals in accordance with the positional location of said film frame in said film scanning zone and for applying said magnitude alterted vertical scan modification signals to said flying spot scanner tube to alter the positional location of said light source on said curved face plate.

2. The linearity correction apparatus of claim 1 wherein said linearity correction means includes an adjustable resistor having an alterable arm and a voltage dependent resistor (VDR), said resistor coupling a potential source to a potential reference level and said voltage dependent resistor (VDR) coupling said alterable arm to said signal combining network means and to siad flying spot scanner tube whereby centering of said linearity correction signal is controllable by said alterable arm.

3. The linearity correction apparatus of claim 1 wherein said linearity correction means includes a first adjustable resistor connected intermediate a potential source and a potential reference level and having an alterable arm, a series connected impedance and voltage dependent resistor (VDR) coupling said alterable arm to signal combining network means, and a second adjustable resistor shunting said impedance and having an alterable arm coupled to said cathode ray tube whereby said first adjustable resistor provides controllable centering and said second adjustable resistor provides controllable magnitude of said linearity correction signal applied to said cathode ray tube.

4. Linearity correction apparatus comprising:

a flying spot scanner system having a cathode ray tube with a curved face plate and providing a light source for application to a light detector by way of film frames continuously advanced at a preselected rate through a film scanning zone by a transport means wherein vertical scanning of the face plate and of the light detector by the light source is non-linear with respect to one another;

means for developing signals at a vertical scanning frequency;

means coupled to said transport means for developing vertical scan modification signals varying in magnitude and frequency at a rate substantially equal to the rate of movement of a film frame through said film scanning zone;

means coupled to said means for developing signals at a vertical scanning frequency and to said means for developing vertical scan modification signals for effecting development of a combined vertical scan and vertical scan modification signal; and linearity correction means including a voltage dependent resistor (VDR) coupling said combined vertical scan and vertical scan modification signals to said cathode ray tube, said means affecting alterations in vertical scanning of said curved face plate by said light source to effect linear scanning of said film frame and light detector by said light source.

5. The linearity correction apparatus of claim 4 wherein said linearity correction means includes a series connected voltage dependent resistor (VDR) and adjustable DC potential source coupled to said combined vertical scan and vertical scan modification signal source and to said cathode ray tube.

6. The linearity correction apparatus of claim 4 wherein said linearity correction means includes a series connected impedance, (VDR) coupling an adjustable DC potential source to said vertical scan and vertical scan modification signal source and an alterable resistor shunting said impedance and having an adjustable arm coupled to said cathode ray tube.

* * * * *